United States Patent [19]
Burchard

[11] Patent Number: 5,992,633
[45] Date of Patent: *Nov. 30, 1999

[54] PROCESS FOR CUTTING AND PACKAGING BLOCKS OF EXPANDED POLYSTYRENE FOAM AS A LOOSE FILL CUSHIONING MATERIAL

[76] Inventor: Edgar Burchard, Calle Oriente 4 No. 578, Ciudad Industrial, Codigo Postal 58200 Morelia Michoacan, Mexico

[*] Notice: This patent is subject to a terminal disclaimer.

[21] Appl. No.: 09/143,662

[22] Filed: Aug. 31, 1998

Related U.S. Application Data

[63] Continuation-in-part of application No. 08/971,720, Nov. 17, 1997.

[30] Foreign Application Priority Data

Apr. 15, 1997 [MX] Mexico ................................. 97 093

[51] Int. Cl.⁶ .................................................. B65D 81/02
[52] U.S. Cl. ........................... 206/523; 53/472; 206/584; 264/296; 428/402
[58] Field of Search ............................. 206/523, 524, 206/584, 497, 499; 264/396; 53/472; 428/402

[56] References Cited

U.S. PATENT DOCUMENTS

| | | | |
|---|---|---|---|
| 2,781,902 | 2/1957 | Smithers | 206/523 |
| 2,860,768 | 11/1958 | Smithers | 206/523 |
| 3,060,513 | 10/1962 | Klink et al. | 206/497 X |
| 3,188,264 | 6/1965 | Holden | 206/589 X |
| 3,435,946 | 4/1969 | Sobek et al. | 206/523 |
| 3,530,213 | 9/1970 | Belle Isle | 206/523 X |
| 3,610,412 | 10/1971 | Morse et al. | 206/497 |
| 3,640,049 | 2/1972 | Fritz et al. | 206/497 X |
| 4,027,064 | 5/1977 | Bussey, Jr. | 206/523 X |
| 4,042,658 | 8/1977 | Collins | 206/584 X |
| 4,104,440 | 8/1978 | Collins | 206/584 X |
| 5,674,344 | 10/1997 | Thompson et al. | 206/584 X |

*Primary Examiner*—Bryon P. Gehman
*Attorney, Agent, or Firm*—Evenson, McKeown, Edwards & Lenahan, PLLC

[57] ABSTRACT

A cutting and packaging process for expanded polystyrene foam blocks having an original geometric, as well as a product, is provided. The process internally cuts the expanded polystyrene foam blocks to provide pre-cut expanded polystyrene foam blocks. The pre-cut expanded polystyrene foam blocks are maintained in their original geometric form and are packaged in this original geometric form to prevent disassembly of said pre-cut expanded polystyrene foam blocks.

15 Claims, 2 Drawing Sheets

PROCESS FOR CUTTING AND PACKAGING BLOCKS OF EXPANDED POLYSTYRENE FOAM AS A LOOSE FILL CUSHIONING MATERIAL

RELATED APPLICATIONS

This application is a continuation-in-part application of U.S. Ser. No. 08/971,720 filed Nov. 17, 1997 allowed Jan. 12, 1999.

FIELD OF THE INVENTION

The present invention relates to a process for the production and packaging of loose fill packaging material, particularly polystyrene foam, or any other type of foam, as is commonly used in the packaging industry. Such packaging material is used for safely packaging objects in a box having larger dimensions than the object.

BACKGROUND OF THE INVENTION

Processes for the production of expanded polystyrene foam blocks are known in the art. Thermoplastic beads, e.g., polystyrene beads, containing a blowing agent, normally hydrocarbon mixtures having a boiling point between 80 to 110 degrees Fahrenheit, are pre-expanded in a vessel by, e.g., introducing steam into the vessel or by controlled heating. After pre-expansion, the beads may be placed in a storage container before molding. One known method and apparatus for expanding loose fill material, such as polystyrene pellets, is disclosed in U.S. Pat. No. 4,790,967.

In the expanded polystyrene foam industry, the cutting process is normally performed most economically using known hot wire cutters. In such hot wire cutters, two parallel electrically isolated metal bars are spaced at a certain distance apart and energized electrically with a low voltage, e.g., 40 volts. Many high resistance wires, e.g. chrome nickel wires having an approximate 0.012 diam., are tensely held in parallel between the isolated metal bars. The current that flows through the high resistance wires heats them up so that they can therefore "melt" the polystyrene when it is passed through the wire "harp".

As discussed above, the production of loose fill materials are known in the art. The most commonly used materials are expanded polystyrene foam (EPS, recycled or "virgin"), starch-based loose fill, corrugated side trim, molded paper pulp, wood shavings, popped corn, etc. A comparison of various loose fill cushioning materials based on protective and environmental performance is well described in the article entitled "Comparison of Various Loose Fill Cushioning Materials Based on Protective and Environmental Performance", *Packaging Technology and Science,* Vol. 7., 229–241 (1994).

Advantageously due to a relatively low price, an extremely low weight in comparison to other products, as well as the possibility of being recycled while not containing any chlorofluorocarbons (CFC), the expanded polystyrene foam (EPS) type of loose fill packing material has been used in large quantities in the industry and has currently the highest percentage of market share. Probably the most used shape of EPS is a "peanut" shape in the form of an "m". The "peanut" shape is formed of an extruded pellet of expandable polystyrene which is later expanded using steam or any other heat source. Another type of "peanut" shape has the form of an "8" and is made of recycled EPS which is then extruded afterward.

All of the known loose fill materials suffer a common problem, especially the loose fill manufactured with EPS, in that they have a large volume and therefore occupy a large amount of space. Of course, this is disadvantageous and inconvenient when it comes to storing the material in warehouses and transporting the material. Thus, the known materials have high transportation and storage costs. Normally, the expanded "peanuts" are transported in fourteen cubic ft polyethylene bags, which are expensive to store and transport.

There is therefore needed a process and product for cutting and packaging the EPS loose fill material so that it can be transported in a "reduced volume" manner so as to diminish the above-mentioned costs while not sacrificing the effectiveness of the product.

There is also needed a process and product for cutting and packaging EPS loose fill material having varying densities in order to protect objects of varying weight.

SUMMARY OF THE INVENTION

The present invention meets these needs by providing a process for producing loose fill packaging material, particularly polystyrene foam, which presents an easy and inexpensive system to solve the high transportation and storage cost problems. The present invention provides a process for cutting an EPS block, and further handling said blocks without any loss of position or disassembly of the EPS units forming the block.

A pre-cut expanded polystyrene foam (EPS) block is held in a correspondingly sized package, for example, a plastic bag or tube. When the fill material is needed, the user takes enough pre-cut units out of the bag, and by hitting the units slightly, they disassemble, thus considerably increasing the original volume. The disassembled units are perfectly adequate to function as loose fill material in the packing of items in order to fill void spaces between the items and their packing boxes.

The production, packaging and handling of the pre-cut EPS bodies without disassembling the block reduces the transportation and storage costs to less than half without losing the efficiency of the product. An additional advantage is that the cut EPS foam shapes do not "flow" and, therefore, the packed items do not:

migrate to the bottom of the box because of vibrations during transportation.

Advantageously, the present invention provides a polystyrene foam block having a wide density range from about 0.4 to 1.75 lbs/cu ft. EPS blocks of such density also provide very good fusion. By providing a wide density range, the present invention can advantageously be used to protect and transport both lightweight and heavy objects.

Other objects, advantages and novel features of the present invention will become apparent from the following detailed description of the invention when considered in conjunction with the accompanying drawings.

DETAILED DESCRIPTION OF THE DRAWINGS

Figure 1:
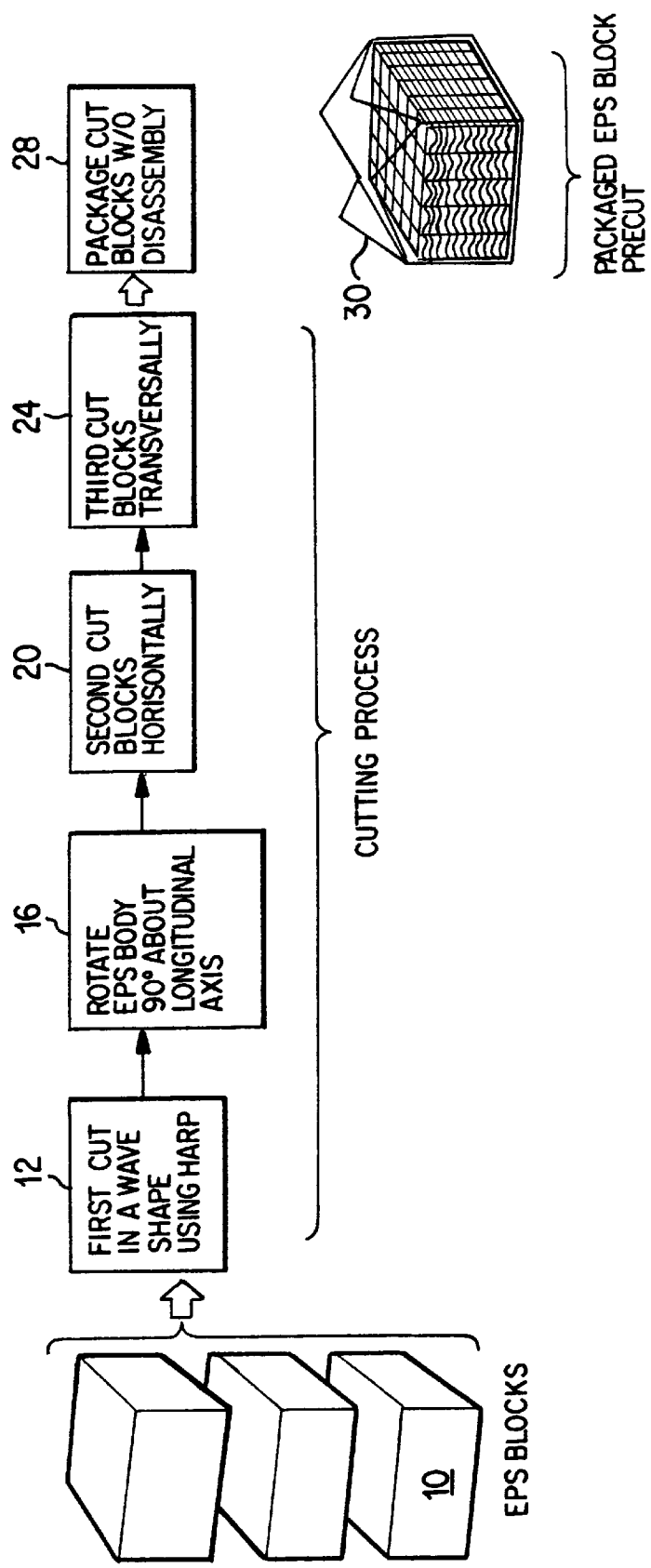
FIG. 1 is a process flow chart illustrating the cutting and packaging process according to the present invention.
Figure 2:
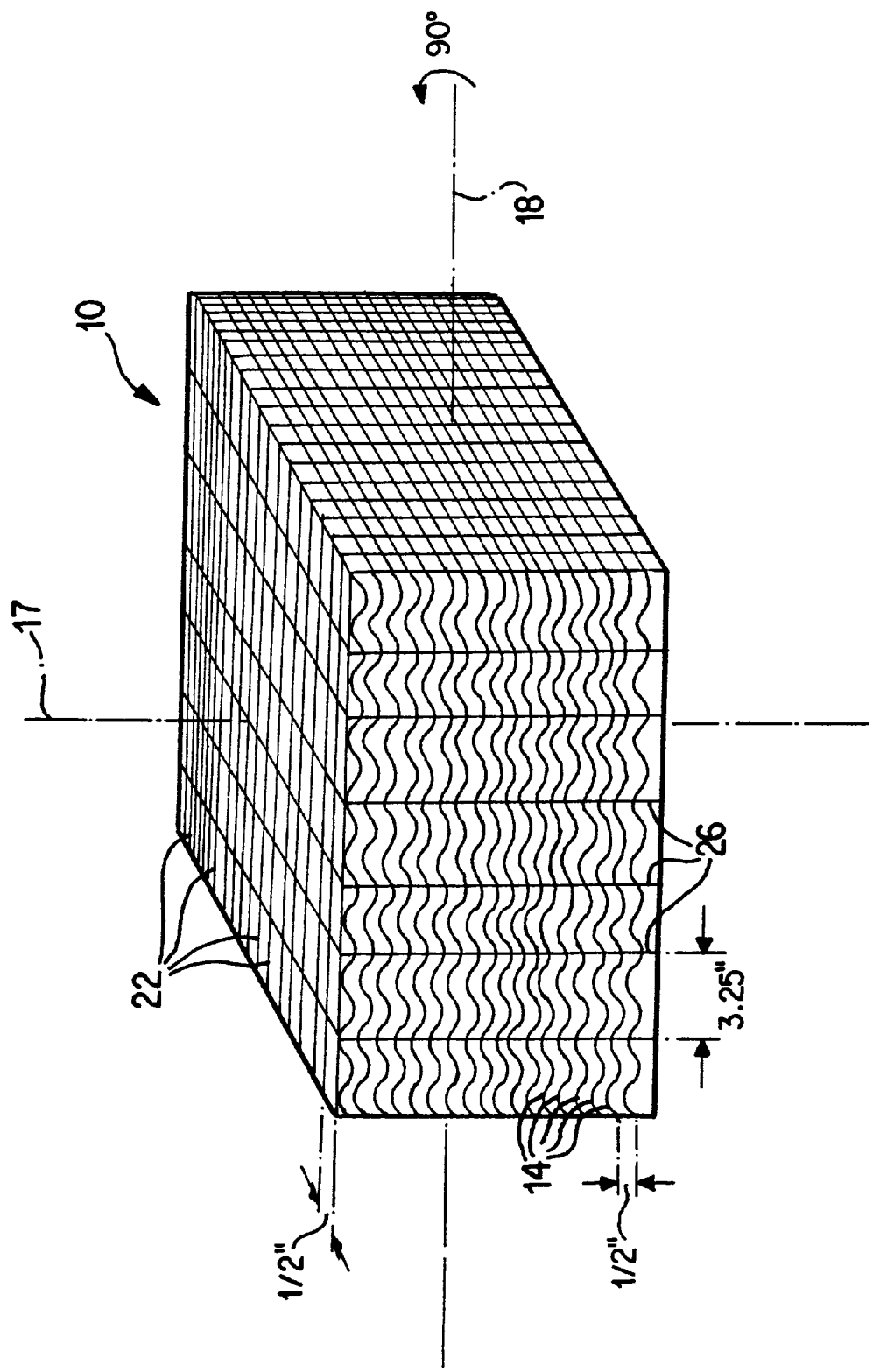
FIG. 2 is an enlarged view of a pre-cut EPS foam block in an assembled state prior to packaging.

Referring to FIGS. 1 and 2, expanded polystyrene block, having a low density (about 0.4–0.75 lbs/cu ft) and very good fusion (in order to avoid dust formation), preferably made with virgin raw material or with partially recycled material, are initially cut into a block or cube form. The initially cut EPS blocks 10 are shown on the left side of FIG. 1. Of course, it is to be understood that the term "block" or "cube" is used herein generically to represent any geometric form such as a square, parallelipiped, etc. These large EPS block bodies subsequently undergo a cutting process via an electrically heated harp which uses parallel arranged wires to cut the block. The use of an electrically heated harped to cut EPS foam blocks is conventionally known in the art.

In the cutting process, a first cut 12 is made in the shape of a wave or sinusoidal waveform using the electrically heated harp. The electrically heated cutting harp moves up and down (vertically as shown in FIG. 2 by reference 17) and at the same time horizontally through the EPS block 10. These wave shaped cuts are represented in FIG. 2 by reference number 14. As shown by the cuts illustrated in FIG. 2, the electrically heated wires are arranged in parallel to one another at a distance of about half an inch.

After the first cut, the EPS body is then rotated 90 degrees during the cutting process 16 about its longitudinal axis 18. The rotated EPS body is then placed on a second cutting machine. Here, a second cut 20 is carried out only in the horizontal direction with the heated wires of the harp being separated also by about half an inch. This second cut is represented in FIG. 2 by reference number 22.

Next, the twice cut EPS body 10 is placed on a third cutting machine. The third cutting machine then cuts the body in a transverse direction perpendicular to the longitudinal axis, with a spacing between the electrically heated cutting wires of about 3.25 inches. This third transverse cut is illustrated in FIG. 2 by reference number 26.

The now cut EPS body 10, as described above, is then packaged without being disassembled. This is advantageously accomplished by introducing the pre-cut EPS block 10 into pre-sized packaging material such as a polyethylene bag 30 or tube. Importantly, this step is performed without allowing the individual cut pieces forming the pre-cut EPS block 10 to become disassembled. The bag or tube is then closed at both ends, for example, using tape or any other suitable adhesive. Of course, it should be understood that any type of packaging material can be used provided the pre-cut EPS block cannot become disassembled inside the packaging material.

In accordance with the cutting and packaging system of the present invention, it is possible to cut various shaped "worm" pieces, such as "S", "V" or "U" shapes having an approximately ⅜" to ½ square cross-section and about a 3–4" length. These parameters of course are by way of illustration only and can be readily varied in order to suit the particular purpose of the loose fill material.

Advantageously, the packaged pre-cut EPS blocks occupy only a minimal volume space in comparison with known loose fill materials which are stored and transported in their disassembled state. For example, a packaged pre-cut EPS block containing 16.6 cu ft of un-disassembled loose fill would occupy a volume of 36 cu ft in its disassembled state. Hence, storage and transportation space is advantageously reduced by over one-half in comparison to conventional loose fill material.

When using the packaged EPS pre-cut block material, the user simply opens the package and removes only so much of the pre-cut block as is necessary. Once the pre-cut block is no longer in the packaging material, it can be readily disassembled with only a minimal amount of effort. By using the material in this manner, the un-used material remains in an assembled state such that it can still be stored with a reduced volume.

While the above embodiment makes use of EPS blocks having a density of about 0.4–0.75 lbs/cu ft, it has been discovered that higher densities of the EPS blocks can also be used. In such an embodiment, the EPS blocks can have a density ranging from the lower limit of about 0.4 lbs/cu ft described above to a higher density of approximately 1.75 lbs/cu ft. Such a composition having a density up to about 1.75 lbs/cu ft can provide loose fill material for protecting heavier objects, such as motors or the like. Even though higher density EPS blocks are used, the overall size and shape of the block can be the same as for the embodiment described with respect to FIGS. 1 and 2. In this case, the manner of cutting and packaging the higher density EPS blocks remains essentially the same.

A "vibration test" was performed with respect to a product:

packaged using the higher density foam material. The packaged product was subjected to rapid movement during the test. The results indicated that the loose fill material having the density range of 0.4–1.75 lbs/cu ft interacted together during the rapid movement so as not to flow. This prevented the packaged item from migrating to the bottom of the package due to the vibrations.

A displacement test was also performed in which a heavy object was dropped from a high point into the loose fill material having the higher density in accordance with the present invention. The results of the test showed that because of the interaction between the loose fill pieces, only minimal displacement occurred, such that the heavy object did not touch the underlying ground surface.

As described above, it has been discovered that even for the heavier density EPS blocks, the preferred cut shape is one of an "s" parabolic, semi-circular, triangular, or any other similar shape. These shapes cause the foam pieces to interact together so as not to displace or flow about the packaged product.

Although the invention has been described and illustrated in detail, it is to be clearly understood that the same is by way of illustration and example, and is not to be taken by way of limitation. For example, the cutting process can be performed with a single machine configured to make the appropriate cuts. The spirit and scope of the present invention are to be limited only by the terms of the appended claims.

What is claimed is:

1. A cutting and packaging process for manufacturing loose fill material from an expanded polystyrene foam block having an original geometric form, the process comprising the acts of:

internally cutting said expanded polystyrene foam block into units of loose fill material;

maintaining said units of loose fill material in the original geometric form of the expanded polystyrene foam block; and packaging said units of loose fill material in the original geometric form to prevent disassembly of said units of loose fill material;

wherein said expanded polystyrene foam block is of a density between about 0.4 to 1.75 lbs/cu ft.

2. The process according to claim 1, further comprising transporting the packaged units of loose fill material for subsequent disassembly.

3. The process according to claim 2, wherein said internally cutting step is performed using electrically heated wires.

4. The process according to claim 1, wherein said expanded polystyrene foam block has a cube-shape or a parallelipiped-shape.

5. The process according to claim 1, wherein said expanded polystyrene foam block is of a low density between about 0.4 and 0.75 lb/cu ft for light objects.

6. The process according to claim 1, wherein said expanded polystyrene foam block is of a density between about 0.75 and 1.75 lb/cu ft for heavy objects.

7. The process according to claim 1, wherein said packaging act further comprises the act of introducing said units of loose fill material in the original geometric form into a flexible and light plastic tube which adapts to the original geometric form of the block and which allows a user to disassemble said units of loose fill material only in amounts actually needed.

8. The process according to claim 1, wherein said packaging act further comprises the act of holding said units of loose fill material in their original geometric form using one of a paper and a foil which allows a user to disassemble said units of a loose fill material only in amounts actually needed.

9. A loose fill material packaged product, comprising:

an expanded polystyrene foam block having internal cuts forming three-dimensional geometric loose fill material units; and a package arranged to hold said internally cut expanded polystyrene foam block in an original geometric form of the block before the block was cut, wherein said expanded polystyrene foam block has a density between about 0.4 and 1.75 lbs/cu ft.

10. The product according to claim 9, wherein said expanded polystyrene foam block has a low density between 0.4 and 0.75 lb/cu ft for light objects.

11. The product according to claim 9, wherein said expanded polystyrene foam block has a density between about 0.75 and 1.75 lbs/cu ft for heavy objects.

12. The product according to claim 9, wherein said expanded polystyrene foam block is in a cube or parallelipiped form.

13. The product according to claim 9, wherein said package is a flexible and light plastic tube which adjusts to said original geometric form and allows a user access to said internally cut expanded polystyrene foam block in order to disassemble a precise portion of the units of loose fill material thereof.

14. The product according to 9, wherein said package is a cardboard box pre-sized to maintain said original geometric form of said internally cut expanded polystyrene foam block.

15. The product according to claim 9, wherein said package is formed of one of a paper and a foil material.

* * * * *